US012647210B2

(12) United States Patent
Yoshioka et al.

(10) Patent No.: US 12,647,210 B2
(45) Date of Patent: Jun. 2, 2026

(54) COMMUNICATION DEVICE AND COMMUNICATION METHOD

(71) Applicant: NTT DOCOMO, INC., Tokyo (JP)

(72) Inventors: Shohei Yoshioka, Tokyo (JP); Shinya Kumagai, Tokyo (JP); Yuki Takahashi, Tokyo (JP); Mayuko Okano, Tokyo (JP); Masaya Okamura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 301 days.

(21) Appl. No.: 18/547,189

(22) PCT Filed: Mar. 2, 2021

(86) PCT No.: PCT/JP2021/008021
§ 371 (c)(1),
(2) Date: Aug. 21, 2023

(87) PCT Pub. No.: WO2022/185420
PCT Pub. Date: Sep. 9, 2022

(65) Prior Publication Data
US 2024/0137157 A1    Apr. 25, 2024
US 2024/0235741 A9    Jul. 11, 2024

(51) Int. Cl.
H04L 1/18      (2023.01)

(52) U.S. Cl.
CPC ...................................... H04L 1/18 (2013.01)

(58) Field of Classification Search
CPC ....... H04L 1/1671; H04L 1/18; H04L 1/1854; H04L 1/1861
See application file for complete search history.

(56) References Cited

U.S. PATENT DOCUMENTS

2017/0280447 A1*   9/2017   Uchino ................. H04L 5/0055
2021/0050933 A1    2/2021   Myung et al.
2021/0219331 A1*   7/2021   Huang .............. H04W 72/1273

FOREIGN PATENT DOCUMENTS

WO      2019139876 A1    7/2019

OTHER PUBLICATIONS

Office Action issued in Japanese Patent Application No. 2023-503576, dated Nov. 12, 2024 (11 pages).
(Continued)

*Primary Examiner* — Mansour Oveissi
(74) *Attorney, Agent, or Firm* — Osha Bergman Watanabe & Burton LLP

(57) ABSTRACT

A communication device includes: a reception unit configured to receive a plurality of data items in a resource autonomously selected by another communication device; a control unit configured to multiplex feedback information corresponding to each of the plurality of data items; and a transmission unit configured to transmit the multiplexed feedback information to the another communication device. The control unit determines which feedback information corresponding to each of the plurality of data items is to be multiplexed and multiplexes the feedback information corresponding to each of the plurality of data items, or the control unit multiplexes the feedback information corresponding to each of the plurality of data items, based on information related to multiplexing of the feedback information corresponding to each of the plurality of data items received by the reception unit from the another communication device.

5 Claims, 15 Drawing Sheets

DATA AND FEEDBACK
RESOURCE INDICATION

(56)        References Cited

OTHER PUBLICATIONS

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

NTT Docomo, Inc.; White Paper "5G Evolution and 6G"; Jan. 2020 (34 pages).

International Search Report issued in PCT/JP2021/008021 on Oct. 12, 2021 (5 pages).

Written Opinion of the International Searching Authority issued in PCT/JP2021/008021 on Oct. 12, 2021 (4 pages).

Moderator (Ericsson); "Feature lead summary#2 on Resource allocation for NR sidelink Mode 1"; 3GPP TSG RAN WG1 Meeting #101-e, R1-2004555; e-Meeting; May 25-Jun. 5, 2020 (23 pages).

Office Action issued in European Patent Application No. 21928996. 4, dated Nov. 4, 2024 (10 pages).

* cited by examiner

DATA AND FEEDBACK
RESOURCE INDICATION

UL

DATA AND FEEDBACK
RESOURCE INDICATION

DL    FEEDBACK VIA INDICATED RESOURCE

DATA AND FEEDBACK
RESOURCE INDICATION

UL    FEEDBACK VIA INDICATED RESOURCE

DATA AND FEEDBACK
RESOURCE INDICATION

COMMUNICATION DEVICE AND COMMUNICATION METHOD

FIELD OF THE INVENTION

The present invention relates to a communication device and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., non-patent literature 1).

In addition, discussions on 6G as the next generation wireless communication method to 5G have been started, and the radio quality exceeding 5G is expected to be achieved. For example, in 6G, discussions are being held aiming at, for example, further increasing the capacity, using a new frequency band, further reducing the latency, further increasing the reliability, and increasing the coverage in the new areas (high altitude, ocean, and universe) (for example, non-patent document 2).

CITATION LIST

Non-Patent Document

[Non-Patent Document 1] 3GPP TS 38.300 V16.4.0 (2020 December)
[Non-Patent Document 2] NTT DOCOMO, INC White Paper "5G Evolution and 6G" (2020 January)

SUMMARY OF THE INVENTION

Technical Problem

In 6G, frequencies higher than the conventional frequencies are expected to be used aiming at the further improvement of the communication speed, capacity, reliability, latency performance, etc. In a case where the higher frequencies are used, there are characteristics such as availability of wider bandwidths, radio waves with strong traveling-straight tendency, and low selectivity of frequency. In addition, there are characteristics of larger Doppler shift and larger path loss.

Because of the characteristics of the frequency band in which the higher frequencies are used, viewing from the network performance, control rules that are different from the conventional cell design or the scheduling technique performed by a base station may be desirable. For example, because the resource contention probability is expected to become lower than the conventional resource collision probability, a system can be considered in which a terminal or a base station autonomously determine a resource to be used for transmission. It is necessary to define a feedback method of performing a retransmission request in the system.

The present invention has been made in view of the above points, and it is an object of the present invention to improve transmission quality by performing feedback in which retransmission is requested, in a wireless communication system in which a resource to be used is autonomously determined.

Solution to Problem

According to the disclosed technique, a communication device is provided. The communication device includes: a reception unit configured to receive a plurality of data items in a resource autonomously selected by another communication device; a control unit configured to multiplex feedback information corresponding to each of the plurality of data items; and a transmission unit configured to transmit the multiplexed feedback information to the another communication device. The control unit determines which feedback information corresponding to each of the plurality of data items is to be multiplexed and multiplexes the feedback information corresponding to each of the plurality of data items, or the control unit multiplexes the feedback information corresponding to each of the plurality of data items, based on information related to multiplexing of the feedback information corresponding to each of the plurality of data items received by the reception unit from the another communication device.

Advantageous Effects of Invention

According to the disclosed technique, in a wireless communication system in which a resource to be used is autonomously determined, the transmission quality can be improved by performing feedback in which retransmission is requested.

BRIEF DESCRIPTION OF THE DRAWINGS

FIG. 3 is a drawing illustrating an example of scheduling.

FIG. 7 is a drawing illustrating an example (4) of transmission and reception in an embodiment of the present invention.

FIG. 10 is an example (3) of a resource for HARQ feedback in an embodiment of the present invention.

FIG. 13 is an example (3) of multiplexing of HARQ feedback in an embodiment of the present invention.

Figure 1:
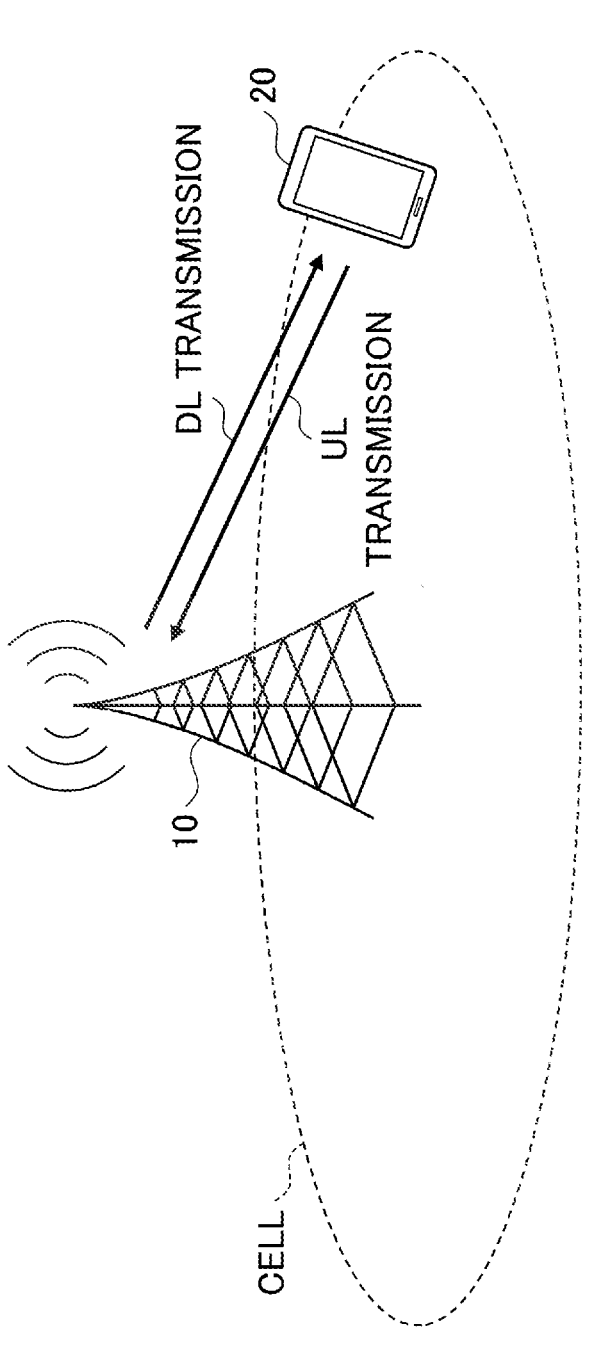
FIG. 1 is a drawing illustrating an example (1) of a wireless communication system according to an embodiment of the present invention.

DETAILED DESCRIPTION OF THE
PREFERRED EMBODIMENTS

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used accordingly. The conventional techniques include, but not limited to, conventional NR or LTE, for example.

FIG. 1 is a drawing illustrating an example (1) of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of the radio signal may be defined in the time domain and the frequency domain, the time domain may be defined by the number of OFDM symbols, and the frequency domain may be defined by the number of sub-carriers or resource blocks. Further, a TTI (Transmission Time Interval) in the time domain may be a slot, or the TTI may be a subframe.

The base station 10 can perform carrier aggregation to communicate with the terminal 20 by bundling a plurality of cells (multiple CCs (component carriers)). One PCell (primary cell) and one or more SCells (secondary cells) are used in the carrier aggregation.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH and PDCCH is called a control signal, and what is transmitted via a shared channel such as PUSCH and PDSCH is called data. These names are mere examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs (component carriers)). One PCell (primary cell) and one or more SCells (secondary cells) are used in the carrier aggregation. In addition, PUCCH-SCell having PUCCH may be used.

Figure 2:
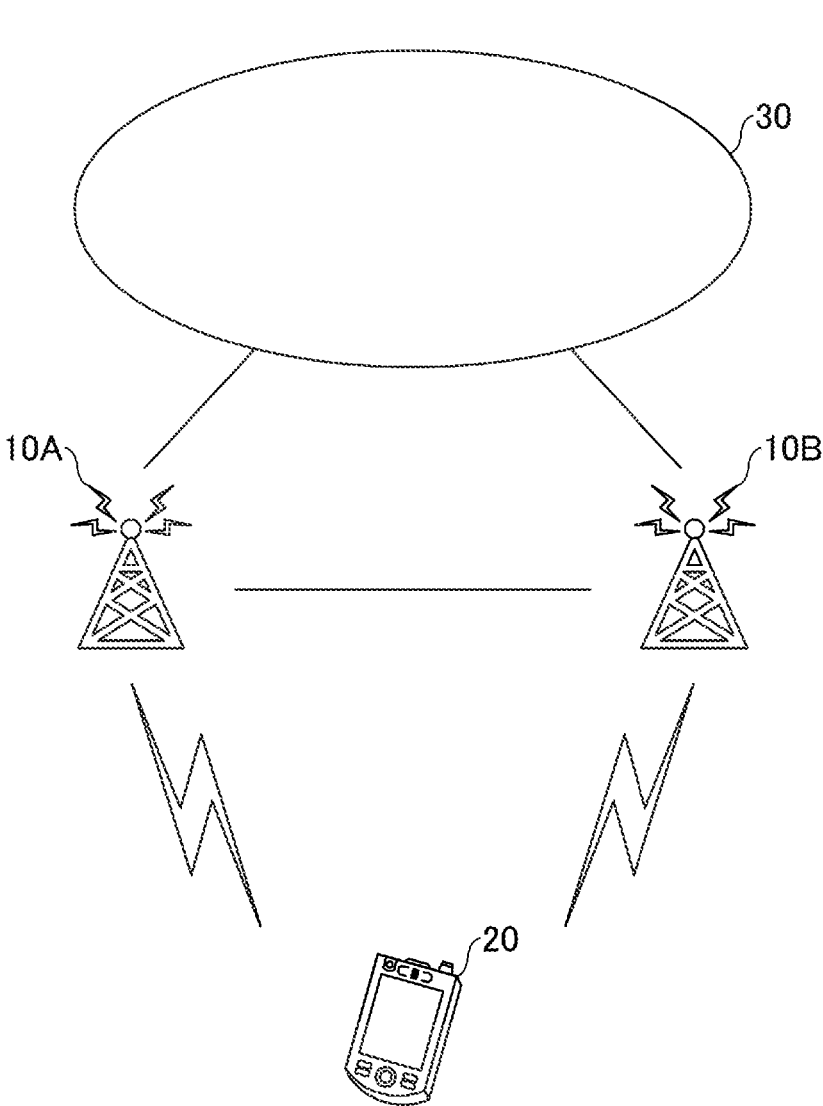
FIG. 2 is a drawing illustrating an example (2) of a wireless communication system according to an embodiment of the present invention.

FIG. 2 is a drawing illustrating an example (2) of a wireless communication system according to an embodiment of the present invention. FIG. 2 shows an example of a configuration of a wireless communication system in a case where DC (Dual connectivity) is performed. As shown in FIG. 2, a base station 10A serving as an MN (Master Node) and a base station 10B serving as an SN (Secondary Node) are provided. The base station 10A and the base station 10B are each connected to a core network. The terminal 20 is enabled to communicate with both the base station 10A and the base station 10B.

A cell group provided by the base station 10A that is an MN is called an MCG (Master Cell Group), and a cell group provided by the base station 10B that is an SN is called an SCG (Secondary Cell Group). In addition, in DC, the MCG includes one PCell and one or more SCells, and the SCG includes one PSCell (Primary SCG Cell) and one or more SCells.

Note that the DC may be a communication method using two communication standards, and any type of communication standards may be combined. For example, the combination may be NR and 6G standards, or may be LTE and 6G standards. In addition, the DC may be a communication method using three or more communication standards and may be referred to as another name different from the DC.

Processing operations in this embodiment may be performed in a system configuration shown in FIG. 1, in a system configuration shown in FIG. 2, or in other system configurations.

Here, in 6G, frequencies higher than the conventional frequencies are expected to be used aiming at the further improvement of the communication speed, capacity, reliability, latency performance, etc. In a case where the higher frequencies are used, there are characteristics such as availability of wider bandwidths, radio waves with strong linearity, and low selectivity of frequency. In addition, there are characteristics of larger Doppler shift and larger path loss.

Because of the characteristics of the frequency band in which the higher frequencies are used, viewing from the network performance, control rules that are different from the conventional cell design or the scheduling technique performed by a base station may be desirable. For example, the necessity of collision avoidance between DL-DL, DL-UL, and UL-UL, and of interference reduction between cells is not so high as compared with the conventional lower frequencies.

Figure 3:
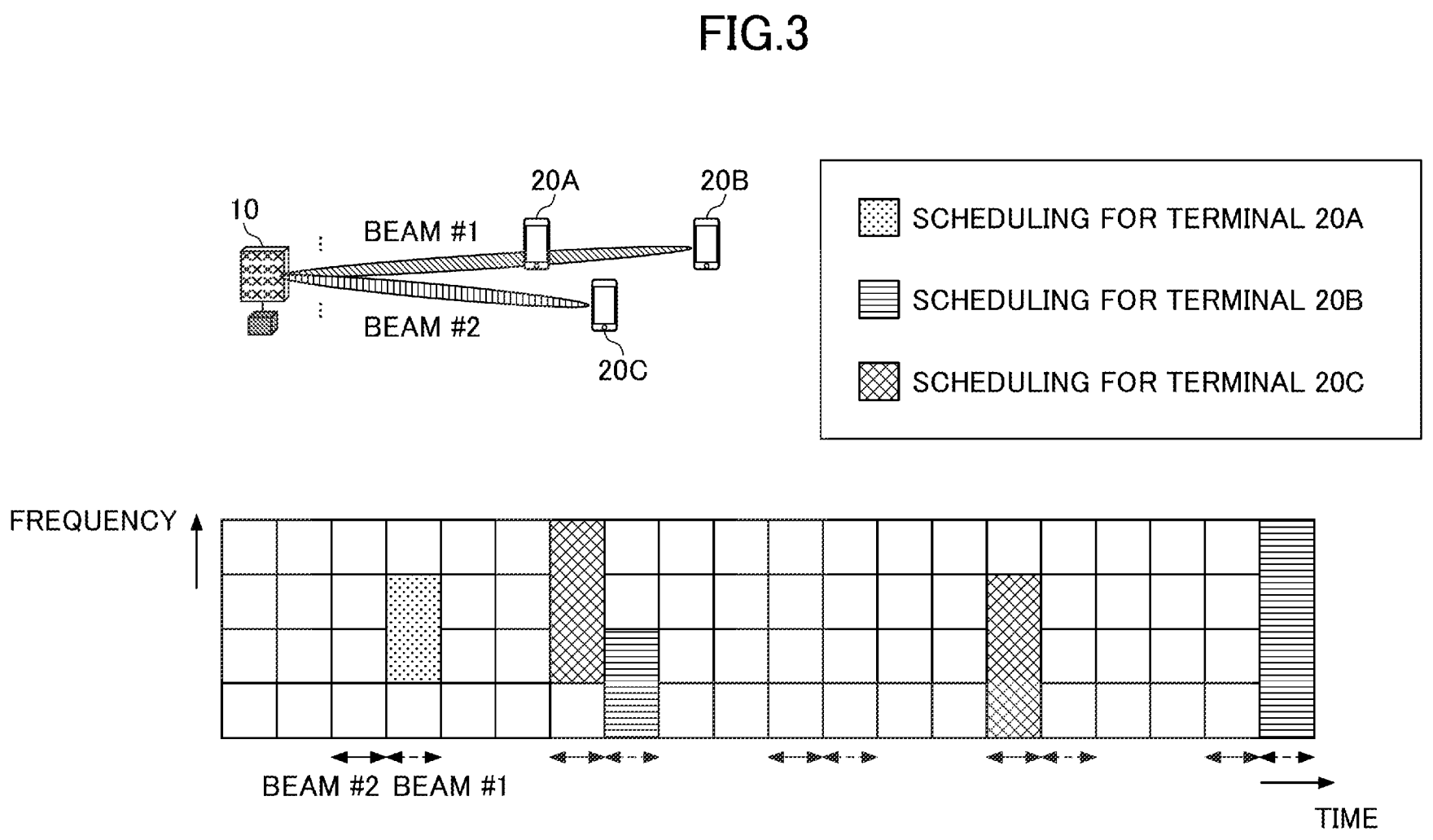

FIG. 3 is a drawing illustrating an example of scheduling. In an example illustrated in FIG. 3, the beamforming of the base station 10 is implemented by using analog technologies, and the scheduling is performed according to TDM (Time division multiplexing) for each beam. As illustrated in FIG. 3, the beam #1 and the beam #2 are multiplexed according to TDM. In an example illustrated in FIG. 3, a base station 10 performs scheduling using TDM for a terminal 20A and terminal 20B that use the beam #1 and for a terminal 20C that uses the beam #2.

The control rule A) and the control rule B) as described below can be considered as control rules without scheduling, for example.

Control rule A) The transmission-side devices, the base station 10 and the terminal 20, perform signal transmission at the freely determined timing. The reception-side devices, the base station 10 and the terminal 20, are required to perform signal detection at all of the timings at which a signal can be received. In a case where a collision of resources used for transmission occurs, the process for the collision is the same as that of a decoding error, and thus, retransmission according to feedback may be performed. In the frequency band in which frequencies higher than the conventional frequencies are used, beams are very narrow, areas are small, and thus, the number of terminals 20 within a given beam is very small. Therefore, it is expected that the collision probability of resources used for transmission is low even in a case where the scheduling by the base station 10 is not performed.

Control rule B) The transmission-side devices, the base station 10 and the terminal 20, perform signal transmission by obtaining a transmission right. In other words, the base station 10 and the terminal 20 perform signal transmission after performing the LBT (Listen before talk) within the system. The reception-side devices, the base station 10 and the terminal 20, are required to perform signal detection at all of the timings at which a signal can be received. The collision of resources used for transmission is avoided by the LBT within the system. In the frequency band in which frequencies higher than conventional frequencies are used, in addition to the low collision probability of resources, an operation of avoiding collision can be performed by detecting in advance a resource collision that rarely occurs due to the interference within the same beam or the interference between cells by using the control rule B.

With respect to both the control rule A and the control rule B, there are cases with frame synchronization and cases without frame synchronization. Hereinafter, the control rules in a case with frame synchronization are referred to as a control rule A1 or a control rule B1, and the control rules in a case without frame synchronization are referred to as a control rule A2 or a control rule B2.

With respect to the control rule A1, the control rule A2, the control rule B1 and the control rule B2, discussions are required for transmission procedures and signal detection procedures. In addition, with respect to the control rule B1 and the control rule B2, discussions are required for the LBT within the system. As elements of the LBT within the system, discussions are required for transmission available time, semi-static transmission without LBT, and avoidance of frequency resource collision. In addition, with respect to the control rule A2 and the control rule B2, discussions related to preambles are required. In addition, with respect to the control rule A1 and the control rule B1, discussions are required for blind detection of control signals.

Note that, hereinafter, the transmission node or the reception node corresponds to one of the base station 10 and the terminal 20.

Figure 4:
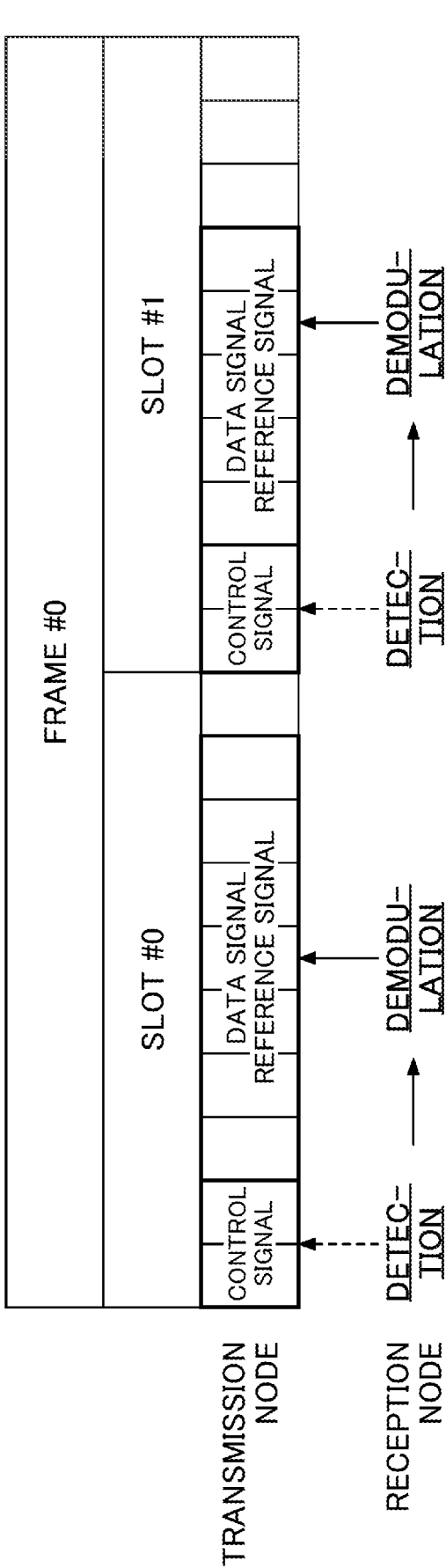
FIG. 4 is a drawing illustrating an example (1) of transmission and reception in an embodiment of the present invention.

FIG. 4 is a drawing illustrating an example (1) of transmission and reception in an embodiment of the present invention. The procedure related to the control rule A1 will be described with reference to FIG. 4. In the control rule A1, operations of 1) to 4) described below may be performed.

1) The transmission node may transmit a signal at a predetermined transmission timing. The transmission signal may include at least one of a data signal, a control signal, and a reference signal. The predetermined transmission timing may be determined based on frames synchronized between the transmission node and the reception node.

2) With respect to the transmission node, when continuously transmitting a plurality of signals, transmission timings other than the initial transmission timing may be determined based on the latest transmitted signal. For example, the transmission timing and the transmission time length for transmissions other than the initial transmission may be indicated or configured in advance to the transmission node, or may be indicated or configured in advance to the reception node. For example, the transmission timing of the transmissions other than the initial transmission may be a timing after x symbols from the end of the latest transmitted signal, may be a timing after y slots from the end of the latest transmitted signal, may be a timing after z frames from the end of the latest transmitted signal, or may be a combination of x, y, and z. For example, the transmission time length of the transmissions other than the initial transmission may be a length of L symbols from the x-th symbol in each slot.

In FIG. 4, an example is shown in which the initial transmission is performed in slot #0, the transmission in the slot #1 is performed at the transmission timing that is a timing after one symbol from the end of the latest transmitted signal, and the transmission timing and the transmission time length are the 0-th symbol in the slot and the length of 7 symbols, respectively.

3) The reception node may perform blind detection of a control signal. The resource of the control signal or the detection occasion (for example, CORESET (Control resource set) or search space) may be defined by technical specifications, or may be configured or indicated by the transmission node. For example, in FIG. 4, the reception node performs blind detection with respect to the control signal that is transmitted using two symbols at the beginning of the slot.

4) The reception node may perform demodulation of a data signal when the control signal is detected. The reception node may identify a resource of data and/or a reference signal, based on the detection result of the control signal. For example, in FIG. 4, the reception node may perform demodulation of a subsequent data signal and/or reference signal when the control signal transmitted in two symbols at the beginning of the slot is detected.

Note that the corresponding relationship of the transmission node and the reception node will be described below. In the downlink, the transmission node is a base station 10 and the reception node is a terminal 20. In the uplink, the transmission node is a terminal 20 and the reception node is a base station 10. In the sidelink, the transmission node is a terminal 20 and the reception node is a terminal 20.

Figure 5:
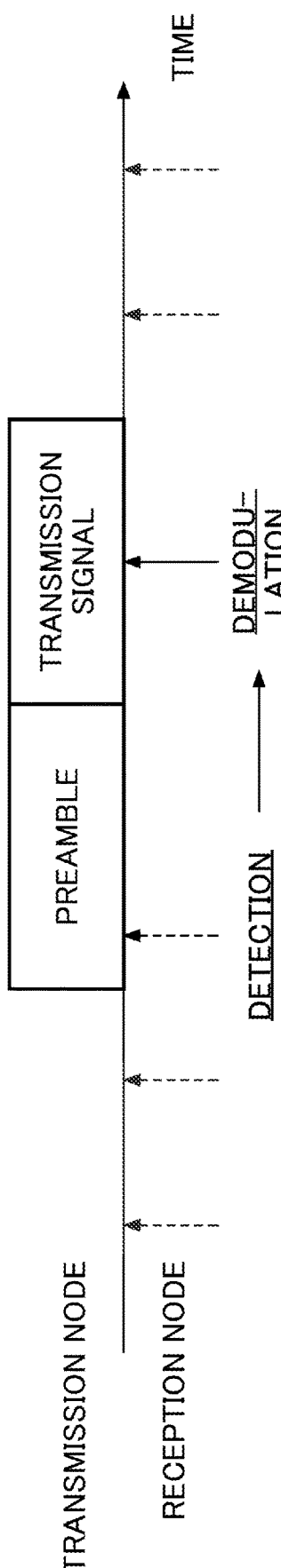
FIG. 5 is a drawing illustrating an example (2) of transmission and reception in an embodiment of the present invention.

FIG. 5 is a drawing illustrating an example (2) of transmission and reception in an embodiment of the present invention. The procedure related to the control rule A2 will be described with reference to FIG. 5. In the control rule A2, operations of 1) to 4) described below may be performed.

1) As illustrated in FIG. 5, the transmission node may perform transmission by adding a preamble signal to the transmission signal. The transmission signal may include at least one of a data signal, a control signal, and a reference signal. The transmission node may start the transmission at any timing.

2) When consecutively transmitting a plurality of signals, the transmission node is not required to add a preamble signal in the transmissions other than the initial transmission in a case where the gap between transmission signals is equal to or less than a predetermined value, or is less than the predetermined value. The predetermined value may be a threshold value. The transmission timing of a signal other than the signal of the initial transmission may be determined based on the latest transmitted signal. For example, the transmission of the subsequent signal may be started after X milliseconds from the end of the latest transmitted signal.

3) The reception node may perform detection of a preamble signal. The reception node may determine that the preamble is detected when reception power of the preamble signal is equal to or greater than a predetermined value or is greater than the predetermined value.

4) The reception node may perform demodulation of a transmission signal when the preamble signal is detected. The reception node may identify a resource of the transmission signal, based on the detection result of the preamble signal. The reception node may identify a resource of the control signal or a detection occasion (for example, CORESET or search space), based on the detection result of the preamble signal, and may perform blind detection of a control signal. In addition, the reception node may perform demodulation of a data signal when the control signal is detected. The reception node may identify a resource of data and/or a reference signal, based on the detection result of the control signal.

Figure 6:
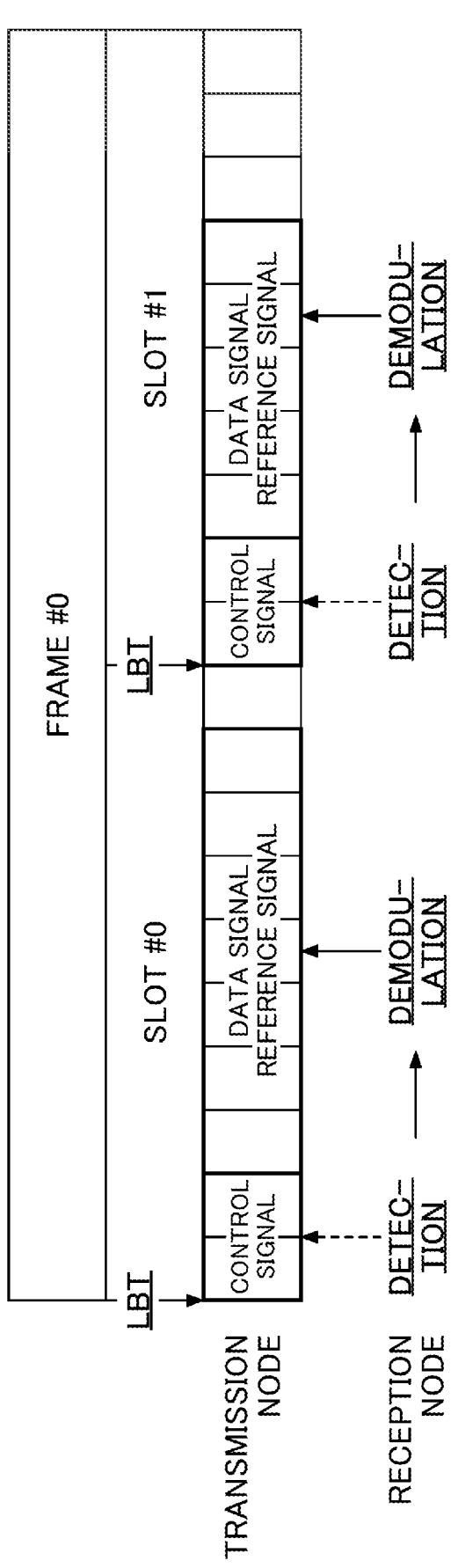
FIG. 6 is a drawing illustrating an example (3) of transmission and reception in an embodiment of the present invention.

FIG. 6 is a drawing illustrating an example (3) of transmission and reception in an embodiment of the present invention. The procedure related to the control rule B1 will be described with reference to FIG. 6. In the control rule B1, operations of 1) to 4) described below may be performed.

1) The transmission node may transmit a transmission signal at a predetermined transmission timing when LBT is successful. For example, as illustrated in FIG. 6, the LBT may be performed at a timing until immediately before a slot in which a signal is transmitted. The transmission signal may include at least one of a data signal, a control signal, and a reference signal. The predetermined transmission timing may be determined based on frames synchronized between the transmission node and the reception node. With respect to the LBT, power detection may be performed during a predetermined time period immediately before the transmission of the transmission signal, and the LBT may be determined to be successful when reception power is equal to or less than a predetermined value or is less than the predetermined value. The predetermined value may be a threshold value. In a case where the LBT fails, another LBT may be performed immediately before the predetermined transmission timing. Alternatively, timings may be defined in the technical specification at which LBT is repeatedly performed until LBT becomes successful, or may be configured in advance by the reception node or may be indicated by the reception node. Note that, in a case where the LBT is performed again and is successful, a transmission signal that is the same as the signal at the time of LBT failure may be transmitted, or a transmission signal that is different from the signal at the time of LBT failure may be transmitted.

2) When consecutively transmitting a plurality of signals, the transmission node is not required to perform LBT for transmissions other than the initial transmission in a case where the gap between transmission signals is equal to or less than a predetermined value, or is less than the predetermined value. In other words, in a case where a gap between a signal that has been transmitted and a signal that is to be subsequently transmitted is equal to or less than a predetermined value or is less than the predetermined value, the signal that is to be subsequently transmitted may be transmitted without performing LBT. The predetermined value may be a threshold value. When consecutively transmitting a plurality of signals, in a case where LBT is successful, the transmission node may perform transmissions without performing LBT for a predetermined period. When continuously transmitting a plurality of transmission signals, transmission timings of signals other than the initial transmission may be determined based on the latest transmitted signal. When continuously transmitting a plurality of transmission signals, the transmission timing and the transmission time of signals other than the initial transmission may be indicated or configured in advance to the transmission node, or may be indicated or configured in advance to the reception node. For example, the transmission timing of the transmissions other than the initial transmission may be a timing after x symbols from the end of the latest transmitted signal, may be a timing after y slots from the end of the latest transmitted signal, may be a timing after z frames from the end of the latest transmitted signal, or may be a combination of x, y, and z. For example, the transmission time length of the transmissions other than the initial transmission may be a length of L symbols from the x-th symbol in each slot.

3) The reception node may perform blind detection of a control signal. The resource of the control signal or the detection occasion (for example, CORESET or search space) may be defined by technical specifications, or may be configured or indicated by the transmission node. For example, in FIG. 6, the reception node performs blind detection with respect to the control signal that is transmitted using two symbols at the beginning of the slot.

4) The reception node may perform demodulation of a data signal when the control signal is detected. The reception node may identify a resource of data and/or a reference signal, based on the detection result of the control signal. For example, in FIG. 6, the reception node may perform demodulation of a subsequent data signal and/or reference signal when the control signal transmitted in two symbols at the beginning of the slot is detected.

Figure 7:
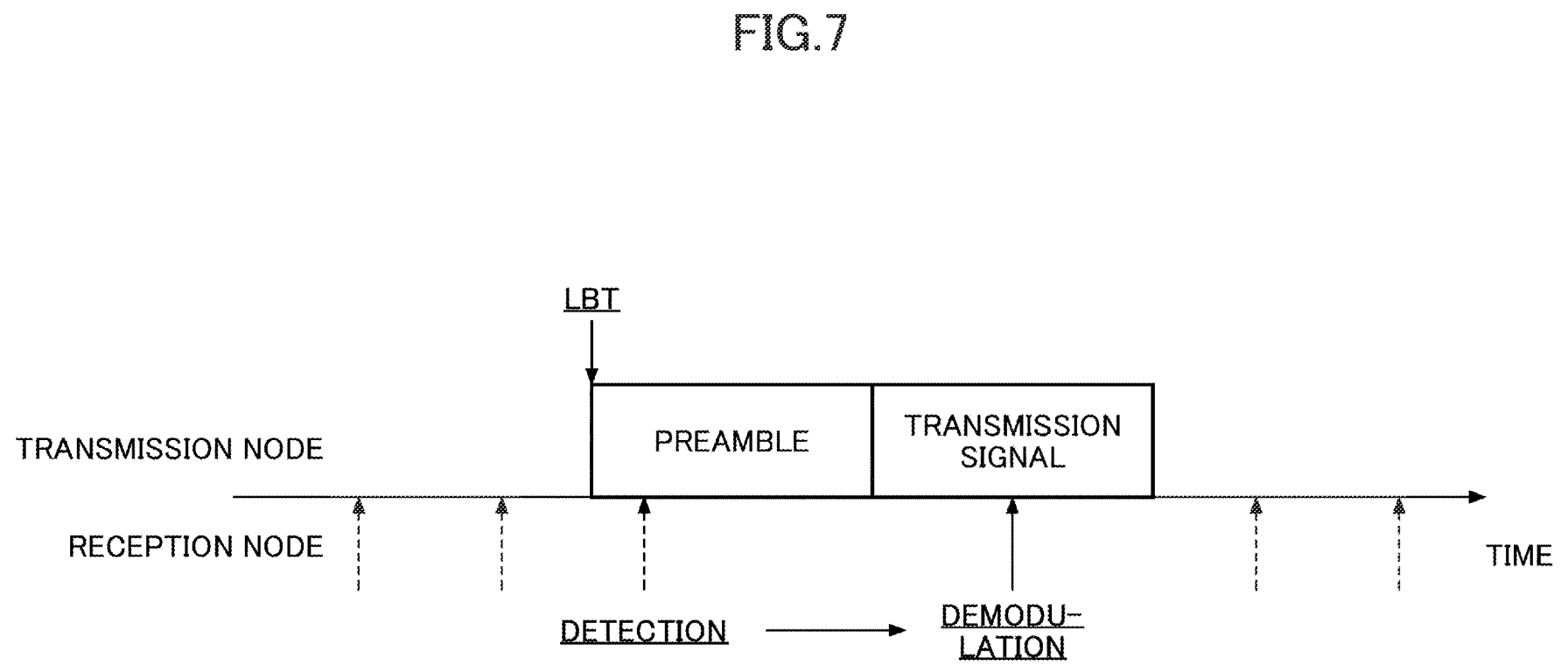

FIG. 7 is a drawing illustrating an example (4) of transmission and reception in an embodiment of the present invention. The procedure related to the control rule B2 will be described with reference to FIG. 7. In the control rule B2, operations of 1) to 4) described below may be performed.

1) The transmission node may perform transmission by adding a preamble signal to the transmission signal when LBT is successful. For example, as illustrated in FIG. 7, the LBT may be performed at a timing until immediately before the transmission of the preamble signal. The transmission signal may include at least one of a data signal, a control signal, and a reference signal. The transmission node may start the LBT and transmission at any timing. With respect to the LBT, power detection may be performed during a predetermined time period immediately before the transmission of the preamble signal, and the LBT may be determined to be successful when reception power is equal to or less than a predetermined value or is less than the predetermined value. The predetermined value may be a threshold value. In a case where the LBT fails, another LBT may be performed immediately before the freely-selected transmission timing. Alternatively, timings may be defined in the technical specification at which LBT is repeatedly performed until LBT becomes successful, or may be configured in advance by the reception node or may be indicated by the reception node.

Note that, in a case where the LBT is performed again and is successful, a transmission signal that is the same as the signal at the time of LBT failure may be transmitted, or a transmission signal that is different from the signal at the time of LBT failure may be transmitted.

2) When consecutively transmitting a plurality of signals, the transmission node is not required to add a preamble signal in the transmissions other than the initial transmission in a case where the gap between transmission signals is equal to or less than a predetermined value, or is less than the predetermined value. The predetermined value may be a threshold value. When consecutively transmitting a plurality of signals, the transmission node is not required to perform LBT for transmissions other than the initial transmission in a case where the gap between transmission signals is equal to or less than a predetermined value, or is less than the predetermined value. The predetermined value may be a threshold value. When consecutively transmitting a plurality of signals, in a case where LBT is successful, the transmission node may perform transmissions without performing LBT for a predetermined period. When continuously transmitting a plurality of transmission signals, transmission timings of signals other than the initial transmission may be determined based on the latest transmitted signal. For example, the transmission of the subsequent signal may be started after X milliseconds from the end of the latest transmitted signal.

3) The reception node may perform detection of a preamble signal. The reception node may determine that the preamble is detected when reception power of the preamble signal is equal to or greater than a predetermined value or is greater than the predetermined value.

4) The reception node may perform demodulation of a transmission signal when the preamble signal is detected. The reception node may identify a resource of the transmission signal, based on the detection result of the preamble signal. The reception node may identify a resource of the control signal or a detection occasion (for example, CORE-SET or search space), based on the detection result of the preamble signal, and may perform blind detection of a control signal. In addition, the reception node may perform demodulation of a data signal when the control signal is detected. The reception node may identify a resource of data and/or a reference signal, based on the detection result of the control signal.

With respect to the control rule A1, the control rule A2, the control rule B1 and the control rule B2, discussions are required for the feedback. For example, discussions are required for the determination method and indication method with respect to the resource used for the HARQ (Hybrid automatic repeat request) feedback. In addition, discussions are required for the method of multiplexing information bits of the HARQ feedback. In addition, discussions are required for the transmission method of the HARQ feedback. In addition, with respect to the CSI (Channel State Information) reporting, discussions are required for: presence or absence of a trigger and a trigger method; definition, a determination method and an indication method of a signal for measurement; and a determination method and a report transmission procedure of the reporting contents.

In a system in which a resource for transmitting data to a reception-side communication device such as a base station 10 or a terminal 20 is autonomously determined by a transmission-side communication device, for example, in a system in which the above-described control rule A1, the above-described control rule A2, the above-described control B1, and the above-described control rule B2 are applied, one of the communication devices described in 1) or 2) is proposed.

1) Transmits data to a communication device, and receives a predetermined signal related to the transmitted data.

2) Receives data from a communication device, and transmits a predetermined signal related to the received data.

According to the above-described communication device, in a system in which a base station 10 or a terminal 20 autonomously selects a resource for DL transmission, UL transmission, or SL transmission, an operation of acknowledgment with respect to the data reception can be clarified. In other words, retransmission can be performed appropriately and transmission quality can be improved.

Note that the predetermined signal related to the transmission data may be a response indicating the success or failure of reception or decoding with respect to the transmission data. The success or failure may be represented by a binary number, 0 or 1, or may be another information indicating the success or failure. Hereinafter, the information in the predetermined signal is referred to as, but not limited to, HARQ-ACK, and an operation of transmitting the predetermined signal is referred to as, but not limited to, HARQ feedback.

Note that the predetermined signal related to the reception data may be a response indicating the success or failure of reception or decoding with respect to the reception data. The success or failure may be represented by a binary number, 0 or 1, or may be another information indicating the success or failure. The information may be different between the success and failure, and the information corresponding to the failure may be information related to the retransmission request or indication. Hereinafter, the information in the predetermined signal is referred to as, but not limited to, HARQ-ACK, and an operation of transmitting the predetermined signal is referred to as, but not limited to, HARQ feedback.

Note that, hereinafter, the base station 10 or the terminal 20 may be described as, for example, a transmission node, a reception node, or a communication device because an embodiment of the present invention can be applied to any of the UL data, DL data, and SL data.

Note that the "resource", "time period", or "window" may include, or is not required to include, the LBT period.

Figure 8:
FIG. 8 is an example (1) of a resource for HARQ feedback in an embodiment of the present invention.
Figure 8:

FIG. 8 is an example (1) of a resource for HARQ feedback in an embodiment of the present invention. As illustrated in FIG. 8, the data transmission node may indicate, to the data reception node, a resource for HARQ feedback. In a case of DL, the base station 10 transmits data and an indication of a feedback resource to the terminal 20. In a case of UL, the terminal 20 transmits data and an indication of a feedback resource to the base station 10. The indicated resource may be indicated using a predetermined time unit (for example, slot), or may be indicated using a predetermined time, frequency, or code unit (for example, symbol, PRB, cyclic shift, or OCC (Orthogonal Cover Code) index).

The data transmission node may specify a predetermined resource, that is, at least one of time, frequency, code, space, etc., as a resource for HARQ feedback, based on a predetermined timing. For example, the predetermined timing may be a synchronization timing in the control rules A1 and B1, or may be a data transmission timing in the control rules A2 and B2.

Information related to the resource for HARQ feedback may be shared by another data transmission node, or the other data transmission node may use a resource other than the said resource. The sharing may be performed only between the terminals 20 that are associated the same beam of the base station 10, or information related to beams may be additionally shared between the said terminals 20. With respect to a plurality of nodes, the information related to the resource for HARQ feedback may be shared via one signal.

The data transmission node may specify a predetermined resource, based on the beam timing of the data reception node.

The resource for HARQ feedback may be specified via any one of a data signal, a control signal, a reference signal, or a preamble signal (in a case where the control rules A2 and B2 are applied). The resource for HARQ feedback may be specified via any one of a data signal, a control signal, a reference signal, or a preamble signal, corresponding to the HARQ feedback (in a case where the control rules A2 and B2 are applied).

Figure 9:
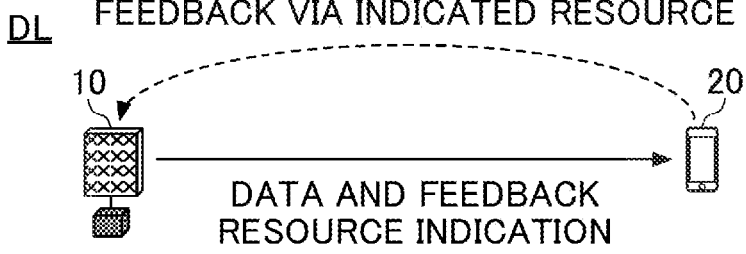
FIG. 9 is an example (2) of a resource for HARQ feedback in an embodiment of the present invention.
Figure 9:
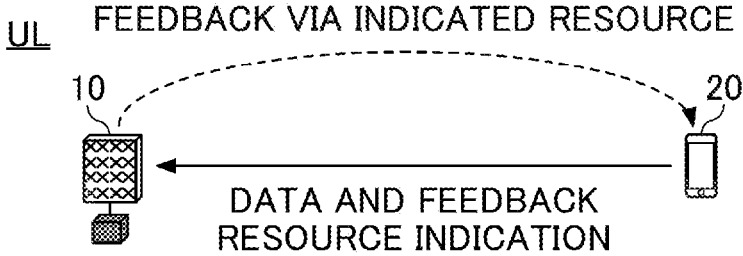

FIG. 9 is an example (2) of a resource for HARQ feedback in an embodiment of the present invention. As illustrated in FIG. 9, the data reception node may transmit HARQ feedback to the data transmission node by using the resource specified by the data transmission node. The data reception node may always transmit HARQ feedback to the data transmission node by using the resource specified by the data transmission node.

In a case where the resource specified by the data transmission node cannot be used, the data transmission node may transmit the HARQ feedback to the data transmission node by using another resource. For example, in a case where there is another scheduled transmission or another scheduled reception in the same time resource as the resource specified by the data transmission node, the data reception node may determine that the specified resource cannot be used. For example, in the control rule A2 or B2, in a case where at least a part of the resource specified by the data transmission node is detected to be used by another node according to the preamble signal detection and related signal decoding, the data reception node may determine that the specified resource cannot be used. For example, in the control rule A2 or B2, in a case where a reception operation is determined to be performed in at least a part of the resource specified by the data transmission node according to the preamble signal detection and related signal decoding, and where the reception and the transmission cannot be performed simultaneously, the data reception node may determine that the specified resource cannot be used. For example, in a case where the transmission using the resource specified by the data transmission node cannot be performed because a signal of another data transmission node is detected by LBT, the data reception node may determine that the specified resource cannot be used. In addition, in a case where the data reception node tries to operate to transmit the HARQ feedback until a predetermined timing, and is unable to transmit the HARQ feedback until the predetermined timing, the data reception node may cancel the HARQ feedback.

The data reception node may autonomously determine a resource for HARQ feedback. For example, the resource for HARQ feedback may be any resource. In other words, there may be no constraint with respect to the timing of HARQ feedback.

Figure 10:
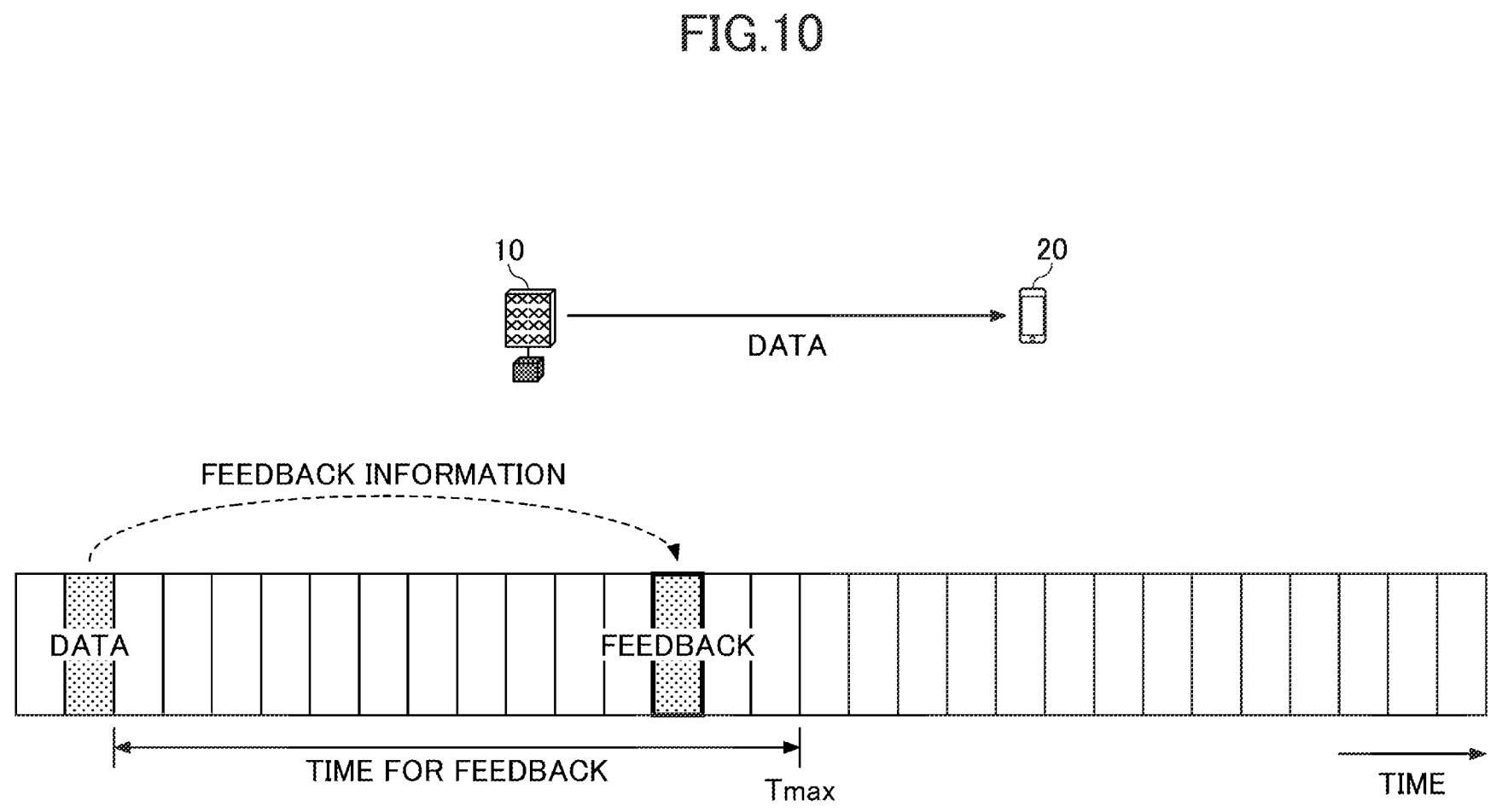

FIG. 10 is an example (3) of a resource for HARQ feedback in an embodiment of the present invention. As illustrated in FIG. 10, when the data reception node autonomously determines a resource for HARQ feedback, the HARQ feedback may be assumed to be performed before the predetermined timing, Tmax. The Tmax may be defined by the technical specifications, may be determined by an upper layer parameter, may be determined by MAC-CE (Media Access Control-Control Element), or may be determined by a control signal (for example, DCI (Downlink Control Information) or UCI (Uplink Control Information)) or a preamble signal.

The Tmax may be a value that varies depending on the case. For example, the Tmax may be a different value for each data reception node, may be a value that varies depending on the frequency (for example, band, carrier, cell), may be 50 a value that varies depending on the service type or requirement (for example, eMBB (enhanced Mobile Broadband), URLLC (Ultra-Reliable and Low Latency Communications)), or may be a value that varies depending on the priority (for example, an index indicating the priority, a value indicating the priority, priority in the PHY layer, priority in the MAC layer). In addition, the Tmax may be applied based on the timing of a predetermined (for example, the first, the last) data reception among the data receptions to be fed back together. In addition, the Tmax may be determined based on a parameter related to LBT. For example, the Tmax may be determined based on the amount of the transmission available timings after the data reception. The parameter related to LBT may be a time width of LBT, or may be a capability related to LBT in the communication device.

A resource group of resources for HARQ feedback may be specified in advance, and the data reception node may determine the resource for HARQ feedback from the resource group. The resource group may be multiplexed with a resource group for data transmission according to TDM or FDM (Frequency division multiplexing).

The data transmission node may indicate predetermined resource candidates for HARQ feedback, and the data reception node may autonomously determine a resource for HARQ feedback from among the resource candidates.

The resource candidates may be a time window for performing the HARQ feedback, and the data reception node may autonomously select a resource for HARQ feedback in the time window as described with reference to FIG. 10.

The resource candidates may be a plurality of time and frequency resources for performing the HARQ feedback, and the data reception node may autonomously select a resource for HARQ feedback in the plurality of time and frequency resources as described with reference to FIG. 10.

The data reception node may perform HARQ feedback with respect to the resource selected from the resource candidates as described with reference to FIG. 10.

A resource group for HARQ feedback may be defined or configured in advance. The resource group may be configured from the base station 10 to the terminal 20, or a common configuration may be determined in advance in the system. The resource for HARQ feedback may be associated with the data transmission and reception resource, or the resource for HARQ feedback may be determined based on the data transmission and reception resource that has been used. Furthermore, operations of the transmission and reception node as described with reference to FIG. 9 and FIG. 10 may be applied.

The resource group that can be used for data transmission and reception may be defined in a manner in which the resource group that can be used for data transmission and reception does not overlap with the resource group that can be used for HARQ feedback. The resource group that can be used for HARQ feedback may be multiplexed with the resource group for data transmission and reception according to TDM or FDM.

The data reception node that has received a plurality of data items may perform transmission to the data transmission node by multiplexing HARQ-ACKs corresponding to data items whose corresponding resources for HARQ feedback are the same. "Resources are the same" may mean that at least one of time, frequency, code, and space is the same with respect to the resources, or, for example, slots are the same with respect to the resources.

The data reception node that has received a plurality of data items may perform transmission to the data transmission node by multiplexing HARQ-ACKs corresponding to data items that are received during a predetermined time period.

Figure 11:
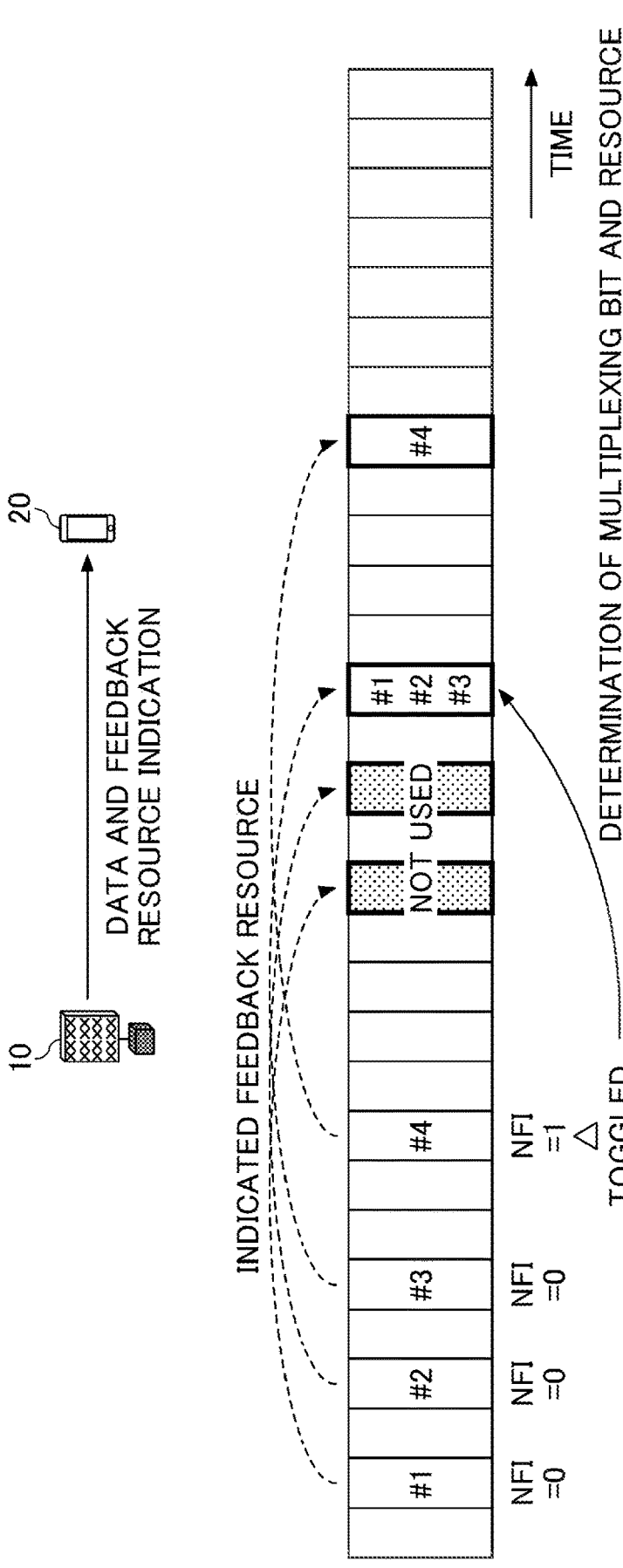
FIG. 11 is an example (1) of multiplexing of HARQ feedback in an embodiment of the present invention.

FIG. 11 is an example (1) of multiplexing of HARQ feedback in an embodiment of the present invention. Information related to multiplexing of HARQ feedback may be included in a signal related to each data (for example, corresponding control signal), and the data reception node may perform transmission to the data transmission node by multiplexing HARQ-ACKs, based on the information. The information may be a feedback group indication. The information may be information used for determining the number of HARQ-ACK bits and bit positions (hereinafter, referred to as information X). The information X may be, for example, DAI (Downlink Assignment Index).

The information may be toggle information of an indicator related to the HARQ feedback, and may be referred to as NFI (New feedback indicator) or FGI (Feedback grouping indicator). As illustrated in FIG. 11, the data reception node may perform transmission to the data transmission node by multiplexing HARQ-ACKs corresponding to data reception related to an un-toggled NFI. In a case where an NFI is toggled, transmission of HARQ feedback corresponding to data reception related to an NFI before the toggle may be triggered. In a case where an NFI is toggled, the information X may be initialized.

In a case where the timing related to the last (that is, data is not received for a predetermined period) NFI reception satisfies a predetermined condition, transmission of HARQ feedback corresponding to data reception related to the NFI value that is the same as (un-toggled from) the said NFI may be triggered. The predetermined condition may be, for example, a case in which predetermined time has elapsed since the last NFI reception, or a case in which the timing is a predetermined time before the HARQ feedback corresponding to the last NFI reception. A signal for indicating the toggle of NFI may be separately defined, or information items indicating toggled/un-toggled directed to a plurality of nodes may be transmitted together via the signal.

Figure 12:
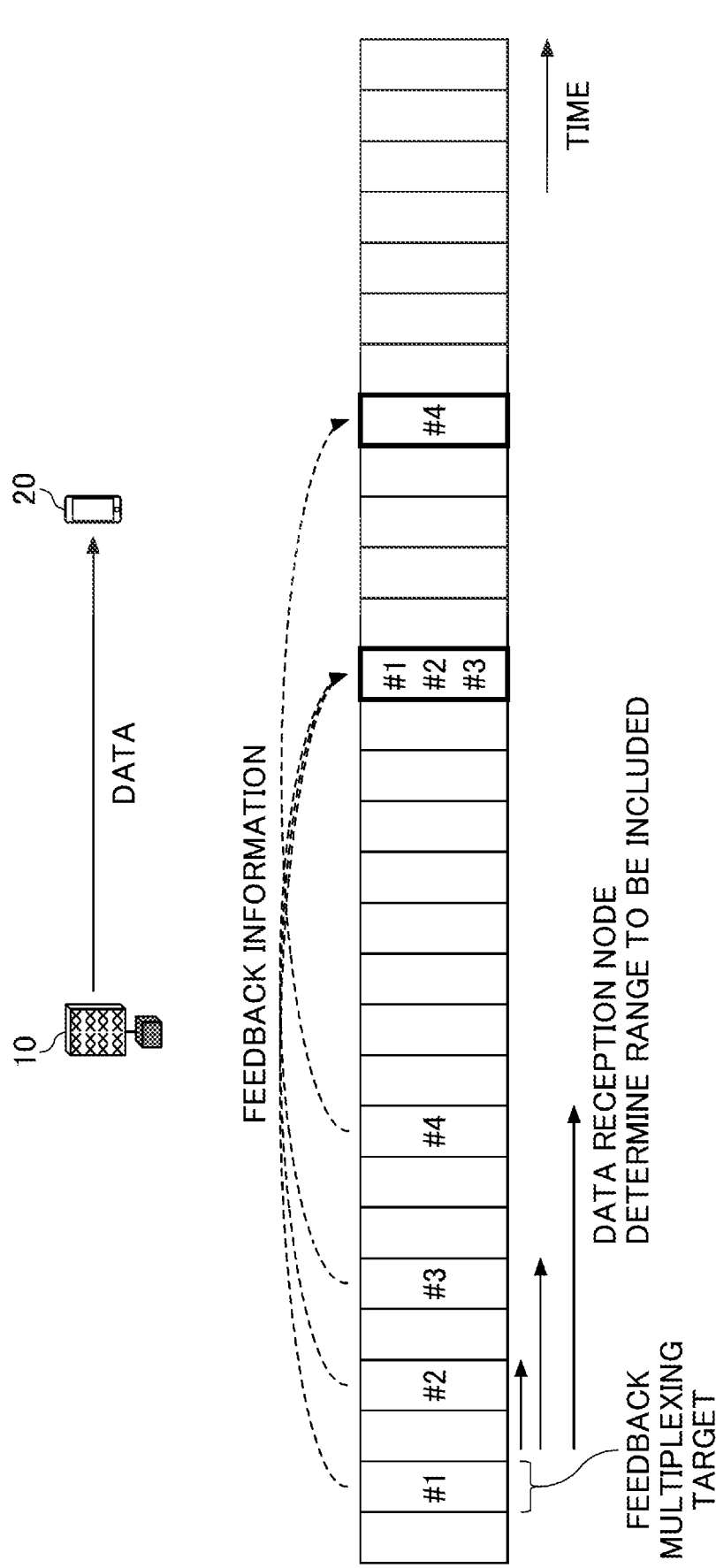
FIG. 12 is an example (2) of multiplexing of HARQ feedback in an embodiment of the present invention.

FIG. 12 is an example (2) of multiplexing of HARQ feedback in an embodiment of the present invention. The data reception node may determine which HARQ-ACKs are to be multiplexed for the feedback. HARQ-ACKs that are multiplexed to be transmitted may be determined under the constraint based on the reception order of corresponding data items. For example, the constraint may be a constraint in which the data reception node must include, in the feedback multiplexing target, feedback information items corresponding to the consecutive data receptions from the oldest data reception among the data receptions for which the feedback has not been performed. In other words, as illustrated in FIG. 12, the feedback information corresponding to data reception may be transmitted in the order from the old data reception to the new data reception, and the data reception node may determine a range of data receptions whose corresponding feedback information items are to be included.

In a case where a plurality of data items are received in a slot (for example, a case according to CA (Carrier Aggregation)), HARQ-ACKs corresponding to all data receptions in the slot may be always multiplexed. The constraint of HARQ-ACKs corresponding to all data receptions in the slot being always multiplexed may be applied to data related to the same priority alone. The priority may be a priority in any of the PHY layer and the upper layer, may be a priority of HARQ-ACK, or may be a priority of corresponding data. The priority may be associated with the traffic type of corresponding data reception, or with the performance requirement (for example, eMBB or URLLC).

The data reception node may transmit, to the data transmission node, information indicating which of the received data items is included in the HARQ feedback as the corresponding data reception, together with the HARQ feedback information. For example, in a case where K-bit HARQ feedback is performed, the data reception node may transmit, to the data transmission node, information related to the first data reception (for example, slot index) of the data receptions corresponding to K bits, together with the HARQ feedback information. In addition, in a case where K-bit HARQ feedback is performed, the data reception node may transmit, to the data transmission node, information indicating K bits, together with the HARQ feedback information.

The number of HARQ-ACK bits may be determined based on the amount of the HARQ feedback resource. For example, the method related to TBS (Transport Block Size) determination may be applied to the control information (for example, UCI, DCI, or HARQ-ACK) transmission. For example, the number of HARQ-ACK bits to be transmitted may be determined based on at least one of the following 1) to 3).

1) A parameter related to MCS (Modulation and Coding scheme). For example, MCS index.

2) Amount of RS. For example, amount of DMRS (Demodulation reference signal), PT-RS (Phase tracking reference signal), or CSI-RS.

3) An upper layer parameter

Figure 13:
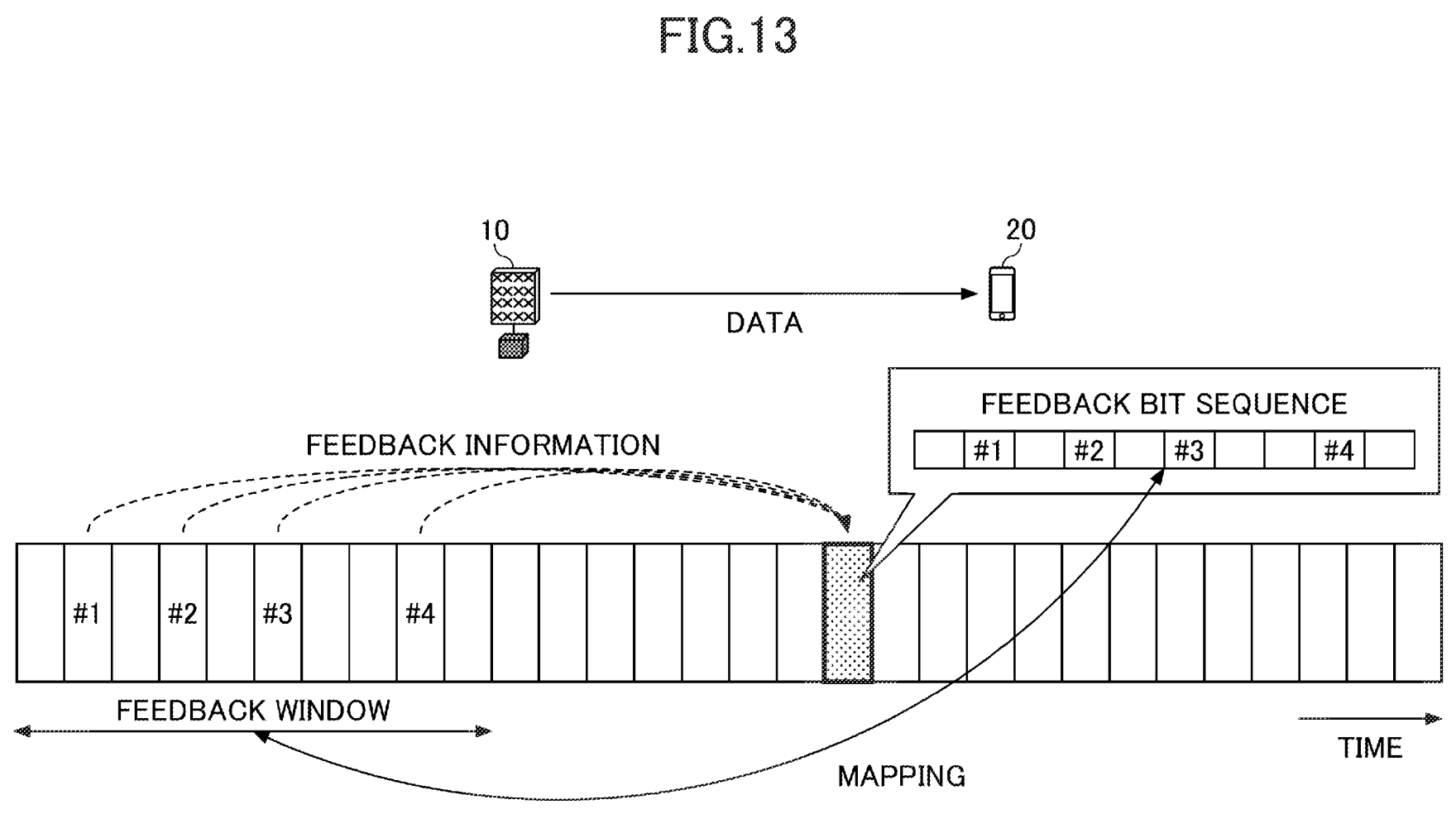

FIG. 13 is an example (3) of multiplexing of HARQ feedback in an embodiment of the present invention. In a case where the number of HARQ-ACK bits corresponding to data reception is not equal to the number of HARQ feedback bits to be transmitted, a predetermined information (for example, NACK) may be stored in a bit that is not used. For example, as illustrated in FIG. 13, the mapping between the bit sequences of data receptions and HARQ feedback may be determined based on the slot used for HARQ feedback, and, in the bit sequence of HARQ feedback, positions of the bits that are not used may be determined. For example, the above-described predetermined information may be stored in bits other than bit #1, bit #2, bit #3 and bit #4 in the HARQ feedback illustrated in FIG. 13.

In a case where the data reception node performs HARQ feedback by using the resource specified by the data transmission node, the resource of the HARQ feedback that is used for multiplexing may be determined based on one of the resources for HARQ feedback specified for each of data items corresponding to HARQ-ACKs to be multiplexed. For example, the data reception node may determine the resource of the HARQ feedback to be used for multiplexing, based on an indication that specifies the last resource received from the data transmission node.

Figure 14:
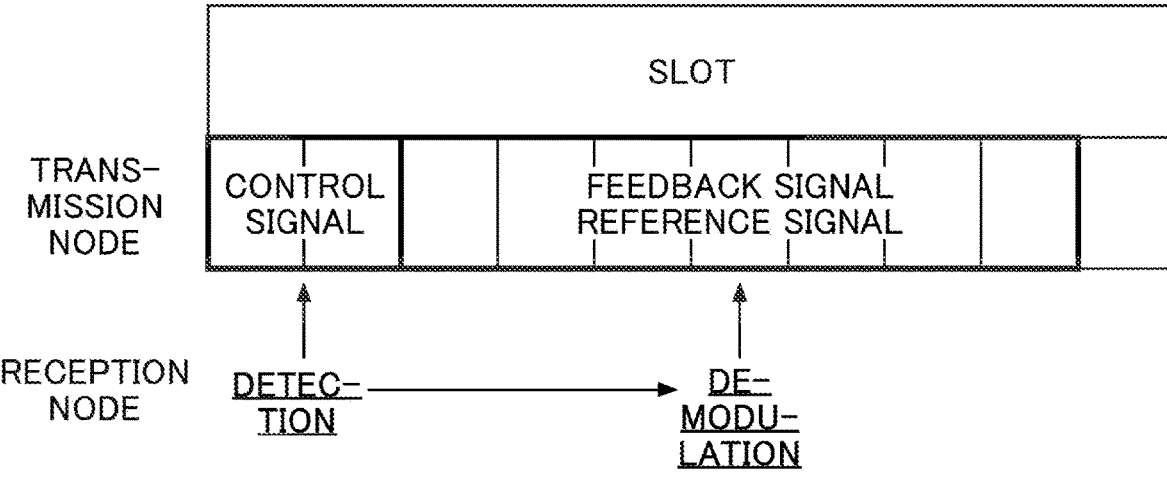
FIG. 14 is an example (1) of transmission and reception of HARQ feedback in an embodiment of the present invention.

FIG. 14 is an example (1) of transmission and reception of HARQ feedback in an embodiment of the present invention. The transmission procedure of HARQ feedback may be the same transmission procedure as the data transmission.

That is, the transmission procedure of the data transmission may be that of a data signal, a control signal, a reference signal and a preamble signal (in a case where the control rules A2 and B2 are applied), and, as illustrated in FIG. 14, the HARQ feedback may be transmitted in place of the data signal, and a HARQ feedback signal, a control signal, a reference signal, and a preamble signal may be transmitted. In addition, in a case where the control rules B1 and B2 are applied, LBT may be performed before the signal transmission.

Figure 15:
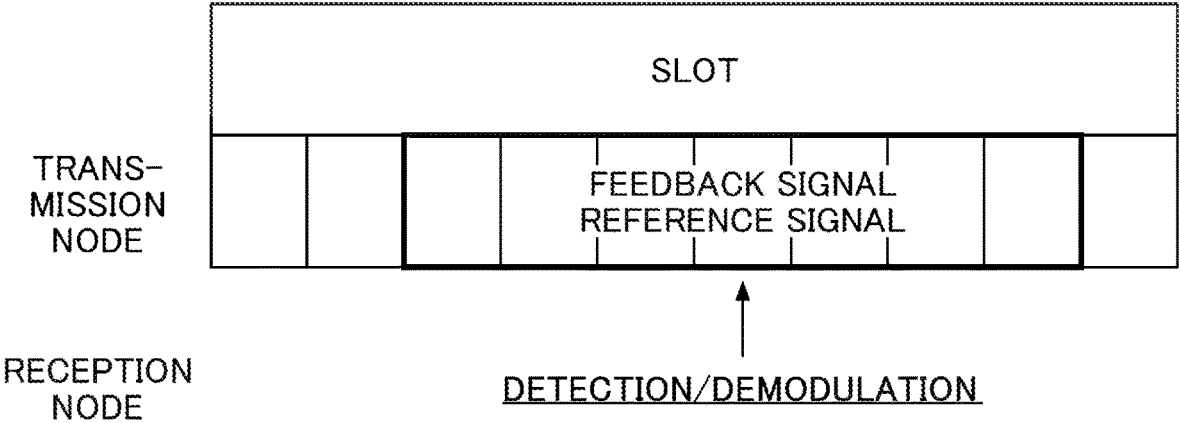
FIG. 15 is an example (2) of transmission and reception of HARQ feedback in an embodiment of the present invention.

FIG. 15 is an example (2) of transmission and reception of HARQ feedback in an embodiment of the present invention. The transmission procedure of HARQ feedback may be different from the transmission procedure of the data transmission. In other words, a signal for HARQ feedback may be defined. As illustrated in FIG. 15, a signal for HARQ feedback and a preamble signal may be transmitted using the specified resource without accompanying the control signal for reception (in a case where the control rules A2 and B2 are applied). In addition, in a case where the control rules B1 and B2 are applied, LBT is not required to be performed before the signal transmission. For example, it may be assumed that the HARQ feedback resource that is indicated by a signal related to corresponding data transmission is not used by another node. In addition, for example, in a case where there is a transmission of the data transmission node or the data reception node, wherein the transmission is located immediately before the HARQ feedback resource or is located within a predetermined gap before the HARQ feedback resource, LBT is not required to be performed.

The data transmission node may assume that the HARQ feedback will be transmitted by the data reception node using the specified HARQ feedback resource. In addition, the data transmission node may assume that the HARQ feedback will be transmitted before a predetermined timing. The predetermined timing may be a timing based on the above-described Tmax.

In a case where a predetermined condition is satisfied, the data transmission node may assume that the HARQ feedback will be transmitted by the data reception node by using the specified HARQ feedback resource. In addition, the data transmission node may assume that the HARQ feedback will be transmitted before a predetermined timing in a case where a predetermined condition is satisfied.

The data transmission node may perform retransmission of the corresponding data in a case where a failure of the data reception or data decoding is reported, or in a case where the HARQ feedback cannot be received (for example, before a predetermined timing). The retransmission of the data may be performed by a method that is the same as the initial transmission. In other words, a data signal, a control signal, a reference signal and a preamble signal (in a case where the control rules A2 and B2 are applied) may be transmitted by the data transmission node, and the HARQ-ACK information may be transmitted in place of data by the data reception node. In addition, in a case of the control rules B1 and B2, LBT may be performed before the signal transmission.

Further, the retransmission of the data may be performed by a method that is different from the initial transmission. In other words, a method for retransmission of the data may be defined. For example, the resource for the data retransmission may be indicated, as information related to the HARQ feedback, from the data reception node to the data transmission node. In a case where the data retransmission is performed using the indicated resource, the data signal, the reference signal, and the preamble signal may be transmitted from the data transmission node without accompanying the control information for reception (in a case where the control rules A2 and B2 are applied). In addition, for example, in a case where the data retransmission is performed using a resource other than the indicated resource, the data retransmission may be performed by using the same method as that of the initial transmission. In addition, in a case of the control rules B1 and B2, LBT may be performed before the signal transmission.

In addition, the data transmission node may transmit a request for retransmission of the HARQ feedback to the data reception node in a case where the HARQ feedback cannot be received (for example, before a predetermined timing).

According to the above embodiment(s), in a system in which a base station 10 or a terminal 20 autonomously selects a resource for DL transmission, UL transmission, or SL transmission, an acknowledgment with respect to the data reception, a retransmission request, and a retransmission operation can be clarified.

In other words, in a wireless communication system in which a resource to be used is autonomously determined, the transmission quality can be improved by performing feedback in which retransmission is requested.

(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only proposed functions in one of the embodiments.

<Base Station 10>

Figure 16:
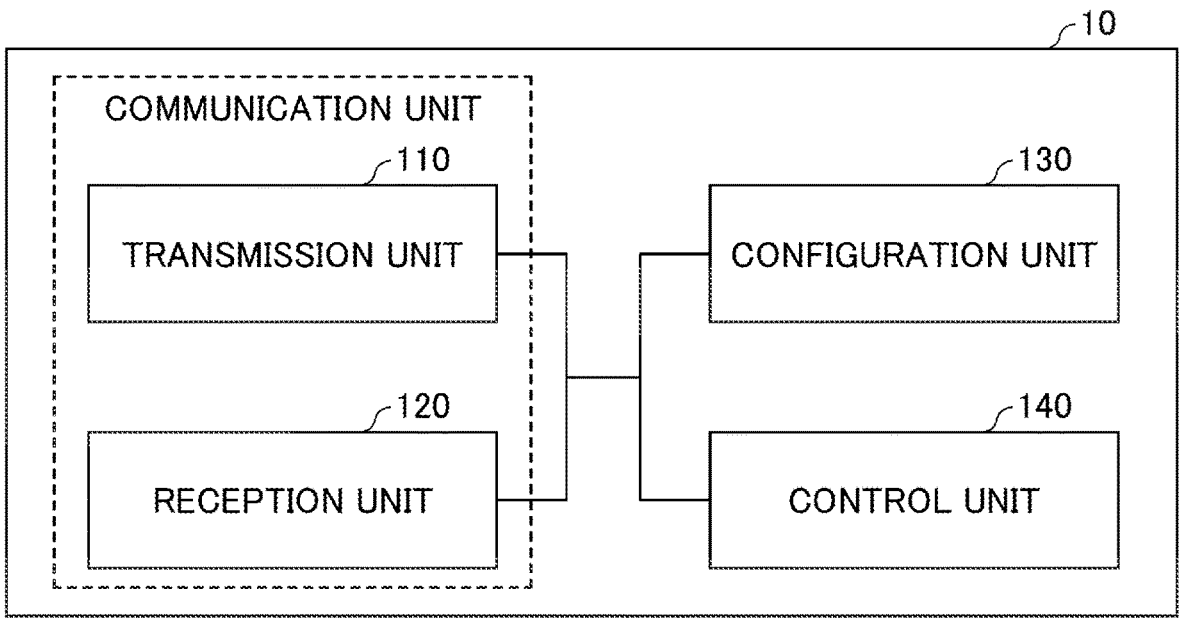
FIG. 16 is a drawing illustrating an example of a functional structure of a base station 10 in an embodiment of the present invention.

FIG. 16 is a diagram illustrating an example of a functional configuration of the base station 10. As shown in FIG. 16, the base station 10 includes a transmission unit 110, a reception unit 120, a configuration unit 130, and a control unit 140. The functional structure illustrated in FIG. 16 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus if necessary. The control unit 140 controls the entire base station 10 including, for example, a control related to signal transmission and reception and a control related to LBT. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 17:
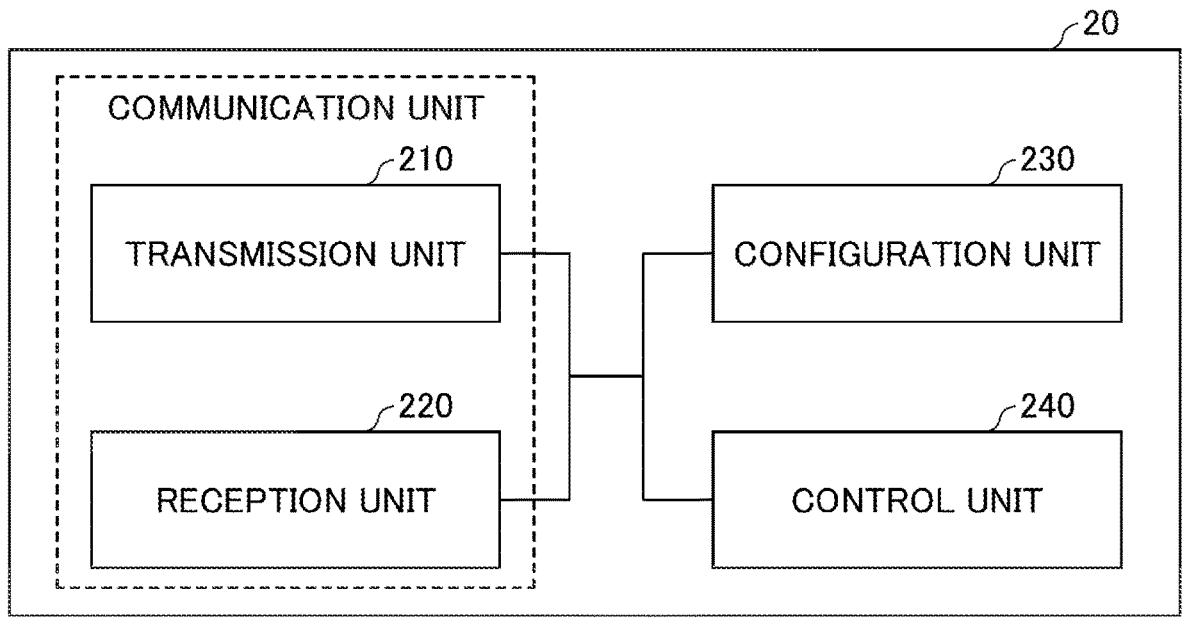
FIG. 17 is a drawing illustrating an example of a functional structure of a terminal 20 in an embodiment of the present invention.

FIG. 17 is a diagram illustrating an example of a functional configuration of the terminal 20. As shown in FIG. 17, the terminal 20 includes a transmission unit 210, a reception unit 220, a configuration unit 230, and a control unit 240. The functional structure illustrated in FIG. 17 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device if necessary. In addition, the configuration unit 230 also stores pre-configured configuration information. The control unit 240 controls the entire terminal 20 including a control related to signal transmission and reception and a control related to LBT. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure)

In the above functional structure diagrams used for describing an embodiment of the present invention (FIG. 16 and FIG. 17), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 18:
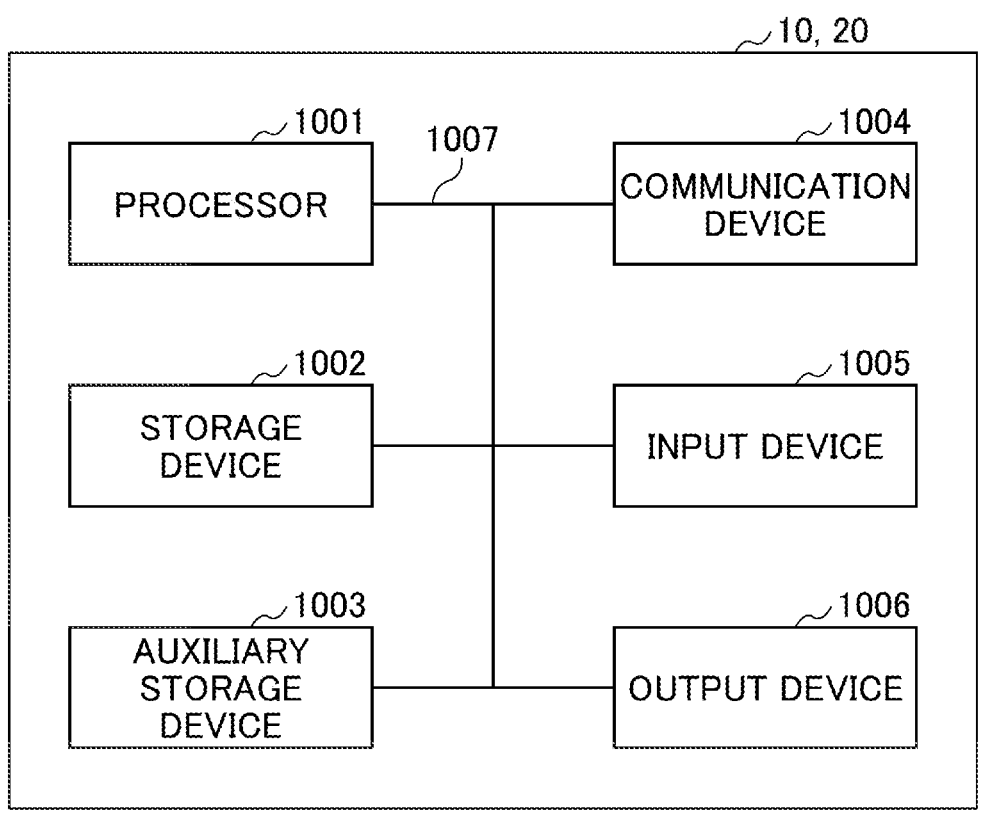
FIG. 18 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 18 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 16 may be realized by control programs that are stored in the storage device 1002 and are executed by the processor 1001. Further, for example, the control unit 240 of the terminal 20 illustrated in FIG. 17 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disc, digital versatile disc, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

EMBODIMENT SUMMARY

As described above, according to an embodiment of the present invention, a communication device is provided. The communication device includes: a reception unit configured to receive a plurality of data items in a resource autonomously selected by another communication device; a control unit configured to multiplex feedback information corresponding to each of the plurality of data items; and a transmission unit configured to transmit the multiplexed feedback information to the another communication device. The control unit determines which feedback information corresponding to each of the plurality of data items is to be multiplexed and multiplexes the feedback information corresponding to each of the plurality of data items, or the control unit multiplexes the feedback information corresponding to each of the plurality of data items, based on information related to multiplexing of the feedback information corresponding to each of the plurality of data items received by the reception unit from the another communication device.

According to the above configuration, in a system in which a base station 10 or a terminal 20 autonomously selects a resource for DL transmission, UL transmission, or SL transmission, an acknowledgment with respect to the data reception, a retransmission request, and a retransmission operation can be clarified. In other words, in a wireless communication system in which a resource to be used is autonomously determined, the transmission quality can be improved by performing feedback in which retransmission is requested.

The control unit may multiplex feedbacks corresponding to data items, of the plurality of data items, in which a value included in corresponding information related to the multiplexing is not toggled, until data is received in which a value included in corresponding information related to the multiplexing is toggled. According to the configuration, in a system in which a base station 10 or a terminal 20 autonomously selects a resource for DL transmission, UL transmission, or SL transmission, feedback corresponding to the data reception can be multiplexed to be transmitted.

The transmission unit may determine to transmit the multiplexed feedbacks to the another communication device when data, of the plurality of data items, in which a value included in corresponding information related to the multiplexing is toggled is received. According to the configuration, in a system in which a base station 10 or a terminal 20 autonomously selects a resource for DL transmission, UL transmission, or SL transmission, feedback corresponding to the data reception can be multiplexed to be transmitted.

The transmission unit may transmit, to the another communication device, information indicating which data, of the plurality of data items, is corresponding to the feedback, together with the multiplexed feedback. According to the configuration, in a system in which a base station 10 or a terminal 20 autonomously selects a resource for DL transmission, UL transmission, or SL transmission, feedback corresponding to the data reception can be multiplexed to be transmitted.

In addition, a communication method performed by a communication device is provided. The communication method includes: receiving a plurality of data items in a resource autonomously selected by another communication device; multiplexing feedback information corresponding to each of the plurality of data items; transmitting the multiplexed feedback information to the another communication device; determining which feedback information corresponding to each of the plurality of data items is to be multiplexed; and multiplexing the feedback information corresponding to each of the plurality of data items, or multiplexing the feedback information corresponding to each of the plurality of data items, based on information related to multiplexing of the feedback information corresponding to each of the plurality of data items received by the reception unit from the another communication device.

According to the above configuration, in a system in which a base station 10 or a terminal 20 autonomously selects a resource for DL transmission, UL transmission, or SL transmission, an acknowledgment with respect to the data reception, a retransmission request, and a retransmission operation can be clarified. In other words, in a wireless communication system in which a resource to be used is autonomously determined, the transmission quality can be improved by performing feedback in which retransmission is requested.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.,) may be replaced with a TTI having a time length exceeding 1 ms, and the short TTI (e.g., shortened TTI, etc.,) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

Note that, in the present disclosure: the base station 10 and the terminal 20; or the transmission node and the reception node, are examples of the communication device.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
30 Core network
1001 Processor
1002 Storage device
1003 Auxiliary storage device
1004 Communication device
1005 Input device
1006 Output device

The invention claimed is:

1. A communication device comprising:

a receiver configured to receive a plurality of data items in a resource autonomously selected by another communication device;

a processor configured to multiplex feedback information corresponding to each of the plurality of data items; and a transmitter configured to transmit the multiplexed feedback information to the another communication device, wherein the receiver is configured to receive, from the another communication device, information related to multiplexing of the feedback information including a value to be toggled, the information related to multiplexing of the feedback information corresponding to each of the plurality of data items, wherein the processor is configured to multiplex feedback information items corresponding to data, of the plurality of data items, for which the value included in corresponding information related to the multiplexing is not toggled, until data for which the value included in corresponding information related to the multiplexing is toggled is received, and wherein the transmitter is configured to determine to transmit the multiplexed feedback information items to the another communication device when data, of the plurality of data items, for which the value included in corresponding information related to the multiplexing is toggled is received.

2. The communication device as claimed in claim 1, wherein the transmitter transmits, to the another communication device, information indicating which data, of the plurality of data items, is corresponding to the feedback information, together with the multiplexed feedback.

3. The communication device as claimed in claim 2, wherein the processor determines a number of bits of the feedback information items to be multiplexed, based on a parameter related to a resource of the feedback information.

4. The communication device as claimed in claim 1, wherein the processor determines a number of bits of the feedback information items to be multiplexed, based on a parameter related to a resource of the feedback information.

5. A communication method performed by a communication device, the communication method comprising:

receiving a plurality of data items in a resource autonomously selected by another communication device;

multiplexing feedback information corresponding to each of the plurality of data items;

transmitting the multiplexed feedback information to the another communication device;

receiving, from the another communication device, information related to multiplexing of the feedback information including a value to be toggled, the information related to multiplexing of the feedback information corresponding to each of the plurality of data items;

multiplexing feedback information items corresponding to data, of the plurality of data items, for which the value included in corresponding information related to the multiplexing is not toggled, until data for which the value included in corresponding information related to the multiplexing is toggled is received; and determining to transmit the multiplexed feedback information items to the another communication device when data, of the plurality of data items, for which the value included in corresponding information related to the multiplexing is toggled is received.

* * * * *